(12) United States Patent
Newman et al.

(10) Patent No.: US 11,544,584 B2
(45) Date of Patent: Jan. 3, 2023

(54) COMMUTE DISTANCE OPTIMIZATION

(71) Applicant: ADP, LLC, Roseland, NJ (US)

(72) Inventors: Kurt Newman, Columbus, GA (US); Debashis Ghosh, Charlotte, NC (US); Robert Wohlers, Castro Valley, CA (US)

(73) Assignee: ADP, Inc., Roseland, NJ (US)

(*) Notice: Subject to any disclaimer, the term of this patent is extended or adjusted under 35 U.S.C. 154(b) by 600 days.

(21) Appl. No.: 15/935,140

(22) Filed: Mar. 26, 2018

(65) Prior Publication Data

US 2019/0294979 A1   Sep. 26, 2019

(51) Int. Cl.
*G06N 5/04* (2006.01)
*G08G 1/01* (2006.01)

(52) U.S. Cl.
CPC .............. *G06N 5/04* (2013.01); *G08G 1/012* (2013.01); *G08G 1/0112* (2013.01); *G08G 1/0125* (2013.01); *G08G 1/0145* (2013.01)

(58) Field of Classification Search
None
See application file for complete search history.

(56) References Cited

U.S. PATENT DOCUMENTS

| | | | | |
|---|---|---|---|---|
| 9,303,997 | B2* | 4/2016 | McGavran | G06N 20/00 |
| 10,429,201 | B2* | 10/2019 | Barth | G01C 21/3694 |
| 2009/0157307 | A1* | 6/2009 | Krumm | G08G 1/096716 |
| | | | | 705/14.69 |
| 2013/0110392 | A1* | 5/2013 | Kosseifi | G01C 21/3415 |
| | | | | 701/410 |
| 2013/0253812 | A1* | 9/2013 | Masutani | G08G 1/0145 |
| | | | | 701/118 |
| 2014/0122164 | A1 | 5/2014 | Lucara | |
| 2015/0268055 | A1* | 9/2015 | Gueziec | G01C 21/36 |
| | | | | 701/423 |
| 2016/0234648 | A1* | 8/2016 | Letz | H04L 67/1095 |
| 2017/0255966 | A1* | 9/2017 | Khoury | B60W 40/00 |
| 2018/0157851 | A1* | 6/2018 | Sgambati | G06F 16/17 |
| 2018/0211541 | A1* | 7/2018 | Rakah | B60W 60/00253 |
| 2018/0259976 | A1* | 9/2018 | Williams | G05D 1/0293 |
| 2018/0286221 | A1* | 10/2018 | Khokhlov | G08G 1/0112 |

OTHER PUBLICATIONS

Zong et al. "Daily Commute Time Prediction Based on Genetic Algorithm", Mathematical Problems in Engineering, vol. 2012, Oct. 30, 3012, 21 pages.

* cited by examiner

*Primary Examiner* — Aniss Chad
*Assistant Examiner* — Stephanie T Su
(74) *Attorney, Agent, or Firm* — Yee & Associates, P.C.

(57) ABSTRACT

A method, system and apparatus for accessing an internal database that includes at least one payroll database, identifying an individual, a first location, a second location, a future date, and a time of day. Responsive to identifying the individual, the first location, the second location, the date, and the time of day, determining a predicted travel time for the individual between the first location and the second location at the time of day on the future date.

21 Claims, 10 Drawing Sheets

COMMUTE DISTANCE OPTIMIZATION

BACKGROUND

1. Field

The present disclosure relates generally to optimizing commute distances, and more particularly, to a method and apparatus for predicting route usage to control traffic flow.

2. Description of the Related Art

Most factories, corporate headquarters, retail locations, and other large businesses have a common problem in that large numbers of people travel to and from the business location during work days. These commuters have multiple routes to choose from in order to complete the commute. When an intersection is blocked on one route, or additional traffic is rerouted though another route, commute times can be affected. Moreover, real estate values can be affected by potential buyers' perceptions of both commute distances and commute times. Furthermore, work productivity is affected by commute times. For example, if commute times for employees could be predicted, work schedules could be modified to allow employees to report at staggered times. Indeed, by cooperation with local government agencies, predicted commute times could be applied to change traffic signals or redirect traffic. Much information is already available to businesses, such as an employee's home address from which routes to work can be easily identified. However, a need exists for an apparatus and method to gather the many types of information to obtain accurate predicted commute times.

Therefore, it would be desirable to have a method and apparatus that take into account at least some of the issues discussed above, as well as other possible issues. For example, it would be desirable to have a method and apparatus that overcome a technical problem with predicting route usage to control traffic flow.

SUMMARY

The illustrative embodiments provide for a computer-implemented method for traffic prediction. The computer implemented method comprises accessing, by a machine intelligence application running on a processor unit, an internal database that includes at least one payroll database. The method identifies, by the machine intelligence application running on the processor unit, an individual, a first location, a second location, a future date, and a time of day. Responsive to identifying the individual, the first location, the second location, the future date, and the time of day, the machine intelligence application, running on the processor unit, determines a predicted travel time for the individual between the first location and the second location at the time of day on the future date.

The illustrative embodiments provide for a traffic prediction system. The traffic prediction system comprises a processor unit, a device, and computer program instructions. The processor unit is connected to a number of internal sources, a number of external sources, and a combined predicted data database. The device is carried by an individual or affixed to a mode of transportation of the individual. The computer program instructions are stored in a computer-readable storage medium and are configured to cause a machine intelligence application running on a processor unit to access an internal database that includes at least one payroll database, identify an individual, a first location, a second location, a future date, and a time of day, and responsive to the processor unit identifying the individual, the first location, the second location, the date, and the time of day, to determine a predicted travel time for the individual between the first location and the second location at the time of day on the future date.

The illustrative embodiments provide for a traffic control system. The traffic control system comprises a processor unit, a device and computer program instructions. The processor unit is connected to a number of internal sources, a number of external sources, and a combined predicted data database. The device is carried by an individual or affixed to a mode of transportation of the individual. The computer program instructions are stored in a storage route and configured to run on the processor unit to cause the processor unit to identify an individual, a first location, and a second location, to analyze predicted route data, and to determine changes to traffic routing to the second location.

The illustrative embodiments provide for a computer program product comprising computer program instructions stored on a computer-readable medium. The computer program instructions are configured to cause a processor unit to identify an individual, a first location, a second location, a future date, and a time of day. The computer program instructions stored on the computer-readable medium are also configured to cause a processor unit, responsive to identifying the individual, the first location, the second location, the date, and the time of day, to determine a travel time for the individual between the first location and the second location on the future date and at the time of day.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
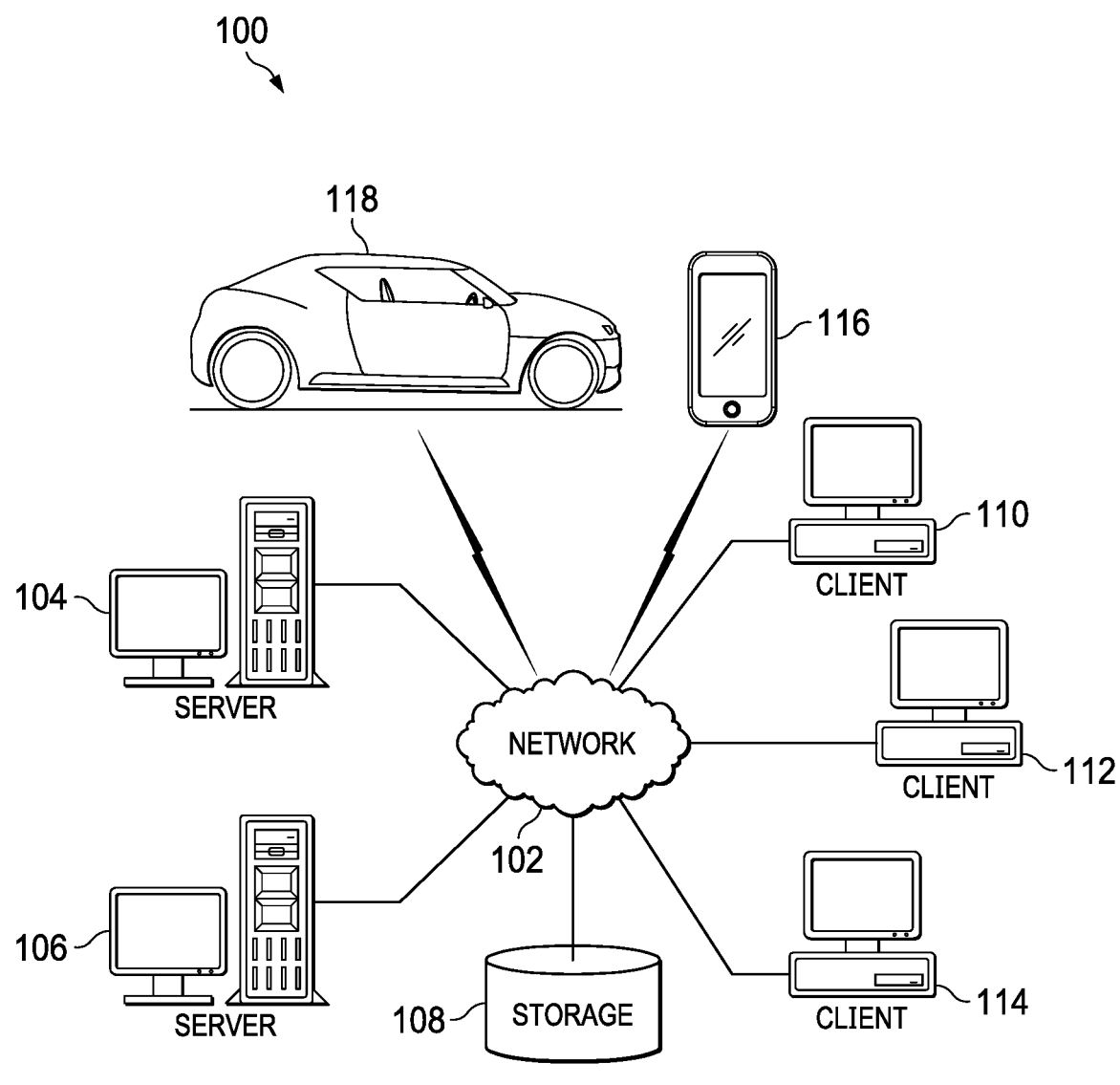
FIG. 1 is an illustration of a network data processing environment in accordance with an illustrative embodiment.

The illustrative embodiments recognize and take into account one or more different considerations. Commute distances may be calculated for employees using home and work addresses within existing employment data for the employee. A variety of data can be used to develop a model that predicts commute distances. For example, such data may include age, residence type (whether house or apartment), residence ownership (whether owned or rented), industry, geographic area, pay level, tenure, and other factors.

Thus, indices can be created to allow commute distance comparisons across industries, geographic regions, ages, pay levels, and other areas. Furthermore, the illustrative embodiments recognize and take into account that employee commute distances are very important for residential housing real estate. However, precise commute distances are difficult to obtain. At least some of the difficulties encountered in attempting to calculate precise commute distances may be found in the vast amount of variables that enter into the behavior of commuters. For example, weather, road construction, accidents, variations in holidays given to commuters, layoffs, economic conditions, fuel availability, fuel prices, public transportation variances caused by strikes, availability or equipment breakdowns, large scale flu outbreaks leading to increased numbers of commuters staying home, major catastrophes such as floods, landslides, and earthquakes, and other types of factors can each incrementally add or subtract to the amount of traffic on the roads and the choices by commuters of particular roads to travel. Therefore, the illustrative embodiments recognize and take into account the problems involved in making predictions with data that can be affected by multiple variables with differing degrees of predictability and probabilities of occurrences.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the Figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, programmable apparatus or other device to produce a computer implemented process, such that the instructions which execute on the computer, programmable apparatus, or other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, client computer 114, mobile phone 116, and vehicle 118. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used, in addition to or in place of client computer 110, client computer 112, and client computer 114, as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
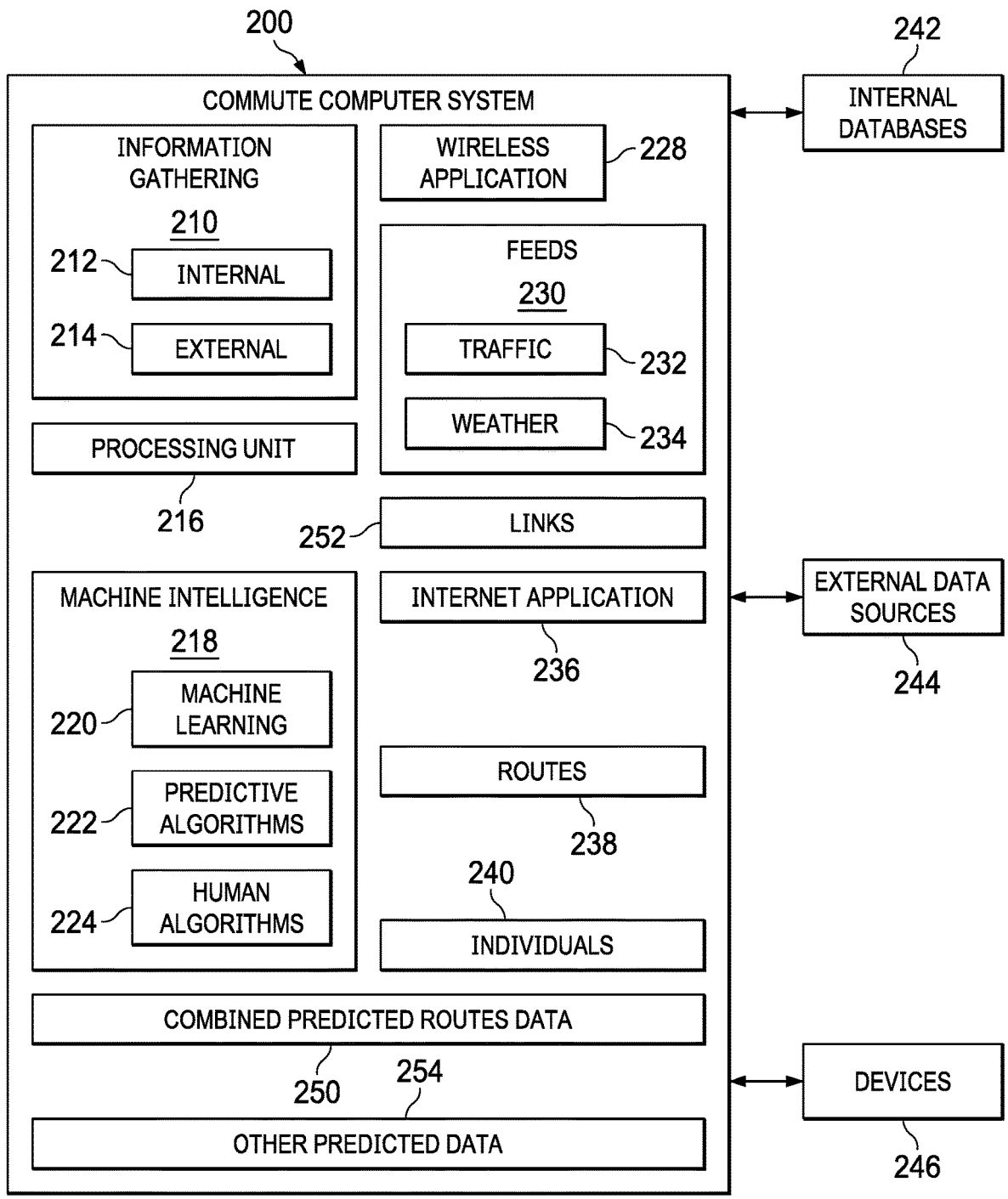
FIG. 2 is an illustration of a commute computer system in accordance with an illustrative embodiment.

Turning now to FIG. 2, a commute computer system is depicted in accordance with an illustrative embodiment. Commute computer system 200 may reside in server computer 104 or server computer 106 in FIG. 1. Alternatively, portions of commute computer system 200 may reside on one or more of server computer 104, server computer 106, client computer 110, client computer 112, client computer 114, mobile phone 116, vehicle 118, and storage unit 108 in FIG. 1.

Commute computer system 200 comprises information gathering 210, processing unit 216, machine intelligence 218, wireless application 228, feeds 230, internet application 236, routes 238 and individuals 240, combined predicted routes data 250, and other predicted data 254.

Information gathering 210 comprises internal application 212 and external application 214.

Figure 12:
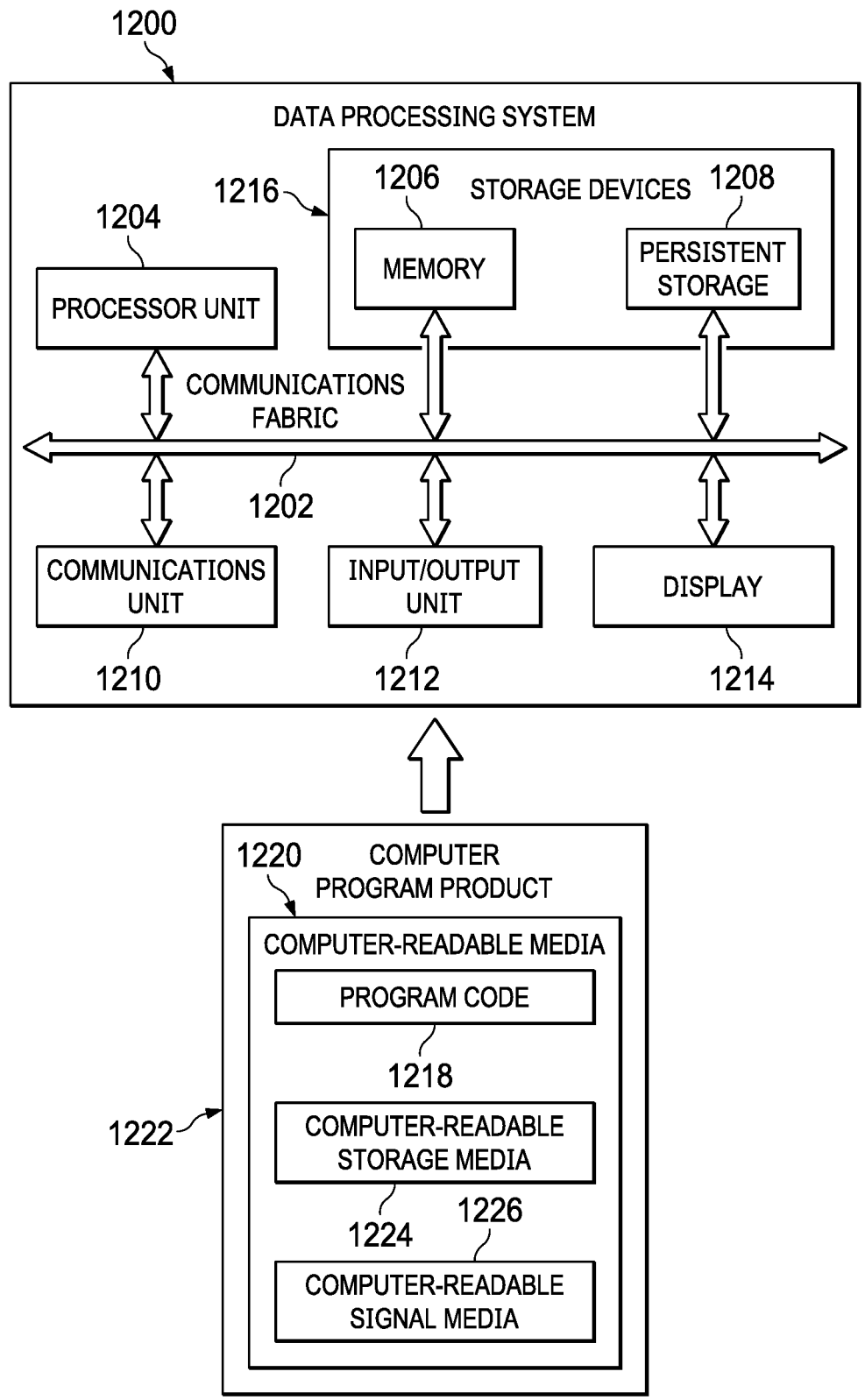
FIG. 12 is an illustration of a block diagram of a data processing system in accordance with an illustrative embodiment.

Processing unit 216 may be a processing unit such as processor unit 1204 in FIG. 12. Processing unit 216 is configured to run the applications in commute computer system 200.

Machine intelligence 218 comprises machine learning 220, predictive algorithms 222, and human algorithms 224.

In this illustrative example, machine intelligence 218 can be implemented using one or more systems, such as an artificial intelligence system, a neural network, a Bayesian network, an expert system, a fuzzy logic system, a genetic algorithm, or other suitable types of systems.

Wireless application 228 is configured to communicate with devices 246. In this example, wireless application 228 communicates with devices 246 using links 252. Links 252 may be configured to include wireless links, internet links, and feed links. Links 252 may be part of network 102 in FIG. 1.

Feeds 230 is configured to continually receive traffic reports 232 and weather reports 234 and to convert the traffic reports 232 and the weather reports 234 into a format for use by machine intelligence 218 and processing unit 216. In this example, feeds 230 communicate with commute computer system 200 using links 252. Links 252 may be part of network 102 in FIG. 1.

Internet application 236 may provide connectivity with internal databases 242, external data sources 244, and devices 246. Internet application 236 may connect with internal databases 242, external data sources 244, and devices 246 using links 252. Links 252 may be part of network 102 in FIG. 1.

Routes 238 may provide data for all routes leading to a first location within a region. In an illustrative embodiment, the first location may be a factory, a corporate headquarters, a retail center, or any other business to which large numbers of people drive to and from during a business day.

Individuals 240 may provide a list of individuals who are known to drive to and from the factory, the corporate headquarters, the retail center, or other business on a routine basis.

Combined predicted routes data 250 may be the result of calculations by machine intelligence 218 in commute computer system 200 to predict routes from routes 238 taken by individuals 240 as further described herein in FIGS. 3-11.

Internal databases 242 are connected to commute computer system 200 and may provide data within the control of a factory, a corporate headquarters, a retail center, or other businesses using commute computer system 200 in accordance with embodiments as further described herein in FIGS. 3-11. Internal data from internal databases 242 may be as described in the illustrative example of FIG. 5.

External data sources 244 are connected to commute computer system 200 and may provide data that is not immediately within the control of a factory, a corporate headquarters, a retail center, or other businesses using commute computer system 200 in accordance with embodiments as further described herein in FIGS. 3-11. External data from external data sources 244 may be as described in the illustrative examples of FIGS. 6-7.

In one illustrative example, one or more technical solutions are present that overcome a technical problem with commuting time prediction and control. One technical problem is the large number of variables that affect commuter behavior each having differing degrees of probability of occurrence and predictability. Thus, a need exists for a specialized computer system to gather and ingest large amounts of data from varying sources and to apply algorithms that analyze the data to create a database of predicted routes for individuals and a combined database for large numbers of individuals in a region.

As a result, commute computer system 200 operates as a special purpose computer system to enable traffic prediction by determining a predicted travel time for an individual between a first location and a second location, and to combine predicted travel times for individual into a combined predicted route database. Moreover, commute computer system 200 may predict a route that a driver should take based on predicted factors, such as traffic congestion, accidents, weather, vacations and holidays. In the illustrative example, commute computer system 200 provides an ability to more efficiently predict travel time by using an individual's data in a payroll database to reduce variables in determining likely traffic flow, resulting in predicting more accurate commute times. Depending on the size of the payroll, and the number of payrolls available from which to obtain data, significant advantages in prediction and traffic control may be obtained over current systems of traffic prediction and control.

The significant advantages follow from the fact that a company processing payrolls for a major corporation in a city may have access to data regarding a significant number of individuals who commute each day. That number may be a percentage of all drivers commuting into the area where the corporation is located. Some payroll processing companies may process payrolls for a number of large corporations, a large number of small companies, a number of mid-size companies, or a combination of large companies, mid-size companies, and large companies. Persons skilled in the art are aware that such payroll data comprising multiple payrolls can contain information on a number of drivers who commute to a particular area that may be a significant percentage, such as by way of illustrative example 20%. Moreover, it is possible that a particular payroll database may contain data regarding individuals who commute to a particular area in a range of from 5% to more than 50% of all individuals commuting within a particular area. The particular area may be a major city with congested traffic. Thus, information regarding a significant number of commuters can be valuable in predicting traffic flow and also enable messaging to individuals whose commute is to begin or is underway allowing the individual to change his or her route. When a significant number of individuals change a usual route, the overall traffic flow may be affected in a positive manner.

Commute computer system 200 provides these advantages through access to one or more payroll databases as well as additional internal and external data sources to reduce variables in predictive analysis. In an illustrative example, commute computer system 200 may take into account vacation dates for individuals from a number of payrolls, thereby adding knowledge regarding the absence of drivers to the data used in calculations. In addition, not all companies take the same holidays. Thus commute computer system 200 may have data that one company will be closed on a certain day while another company will be open, thus adding knowledge that a certain number of individuals will not be commuting to the particular area on that day. Furthermore, the commute data for each individual may include the time at which they begin the commute to work and the time the individual returns home. Data regarding the commute routes and time of large numbers of individuals can be aggregated into combined predicted data routes that can be made available to local and even state governments in controlling, regulating, and planning traffic flow. Thus, commute computer system 200 reduces variables by dealing with data only from persons required to travel from a home location to a work location. Dealing with data only from persons required to travel from a home location to a work location allows greater reliability and efficiency in predicting travel times for routes into and out of the particular area. Commute computer system 200 leverages the data in payroll database to provide a real-time insight into the numbers of commuters entering and leaving a particular area, as well as predictions of future traffic flow on routes into and out the particular area.

In an illustrative embodiment, commute computer system 200 identifies an individual, a first location, a second location, a future date, and a time of day, and responsive to identifying the individual, the first location, the second location, the date, and the time of day, determines a predicted travel time for the individual between the first location and the second location at the time of day on the future date. The foregoing predicted travel time could not be obtained automatically without access to the payroll database.

Commute computer system 200 may operate within a network such as network 102 in FIG. 1 and may use computers, such as server computer 104, server computer 106, client computer 110, client computer 112, and client computer 114 in FIG. 1. Commute computer system 200 may also operate using a data processing system, such as data processing system 1200 in FIG. 12. However, commute computer system 200 has a number of components that are configured to cause a processor unit, such as processor unit 1204, to perform tasks that a standard computer system cannot perform. Specifically, commute computer system 200 is made special by information gathering 210, machine intelligence 218, wireless application 228, feeds 230, internet application 236, routes 238, individuals 240, and the connection of processing unit 216 to internal databases 242, external data sources 244, and to devices 246 as depicted in FIG. 2. Moreover, the foregoing special components of commute computer system 200 operate in conjunction with databases, such as databases depicted in FIGS. 5-7 and instructions provided by programs, such as programs 800 in FIG. 8, to perform algorithms as described in flowcharts in FIGS. 9-11.

Figure 3A:
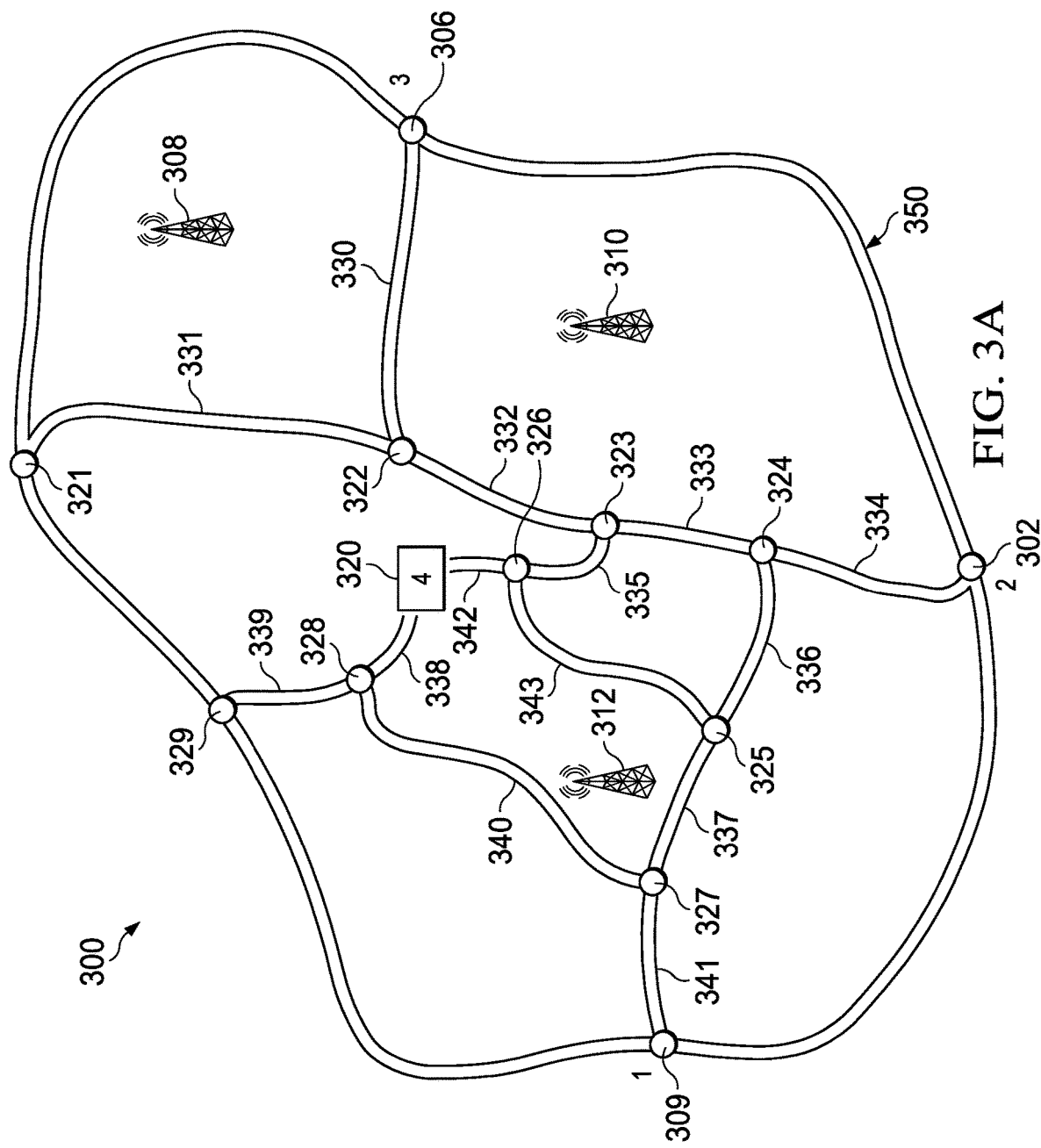
FIG. 3A is an illustration of a road network on which the commute computer system may be employed in accordance with an illustrative embodiment.

Turning now to FIG. 3A, an illustration of a road network on which the commute computer system may be employed is depicted in accordance with an illustrative embodiment. Region 300 depicts an illustrative example of a road network comprising a number of road segments and a number of intersections. The number of segments in this example include road segment 330, road segment 331, road segment 332, road segment 333, road segment 334, road segment 335, road segment 336, road segment 337, road segment 338, road segment 339, road segment 340, road segment 341, road segment 343, and road segment 350. The number of intersections includes intersection 322, intersection 324, intersection 323, intersection 326, intersection 325, intersection 327, intersection 328, a first location 320, and a number of second locations, such as second location 321, second location 306, second location 302, second location 309, and second location 329. Second location 321, second location 306, second location 302, second location 309, and second location 329 may be the homes of workers who commute to a business at first location 320. Each worker departing from one of the second locations has a number of different route choices to get to and from first location 320. Region 300 may also have tower 308, tower 310, and tower 312. Tower 308, tower 310, and tower 312 may be communication towers providing location information on cell phones carried by the workers during their commute to and from the first location. Cell phones may be mobile phone 116 in FIG. 1. In addition, tower 308, tower 310, and tower 312 may be configured to communicate with devices attached to automobiles of workers commuting from one of the second locations to the first location. Automobiles may be vehicle 118 in FIG. 1.

Figure 3B:
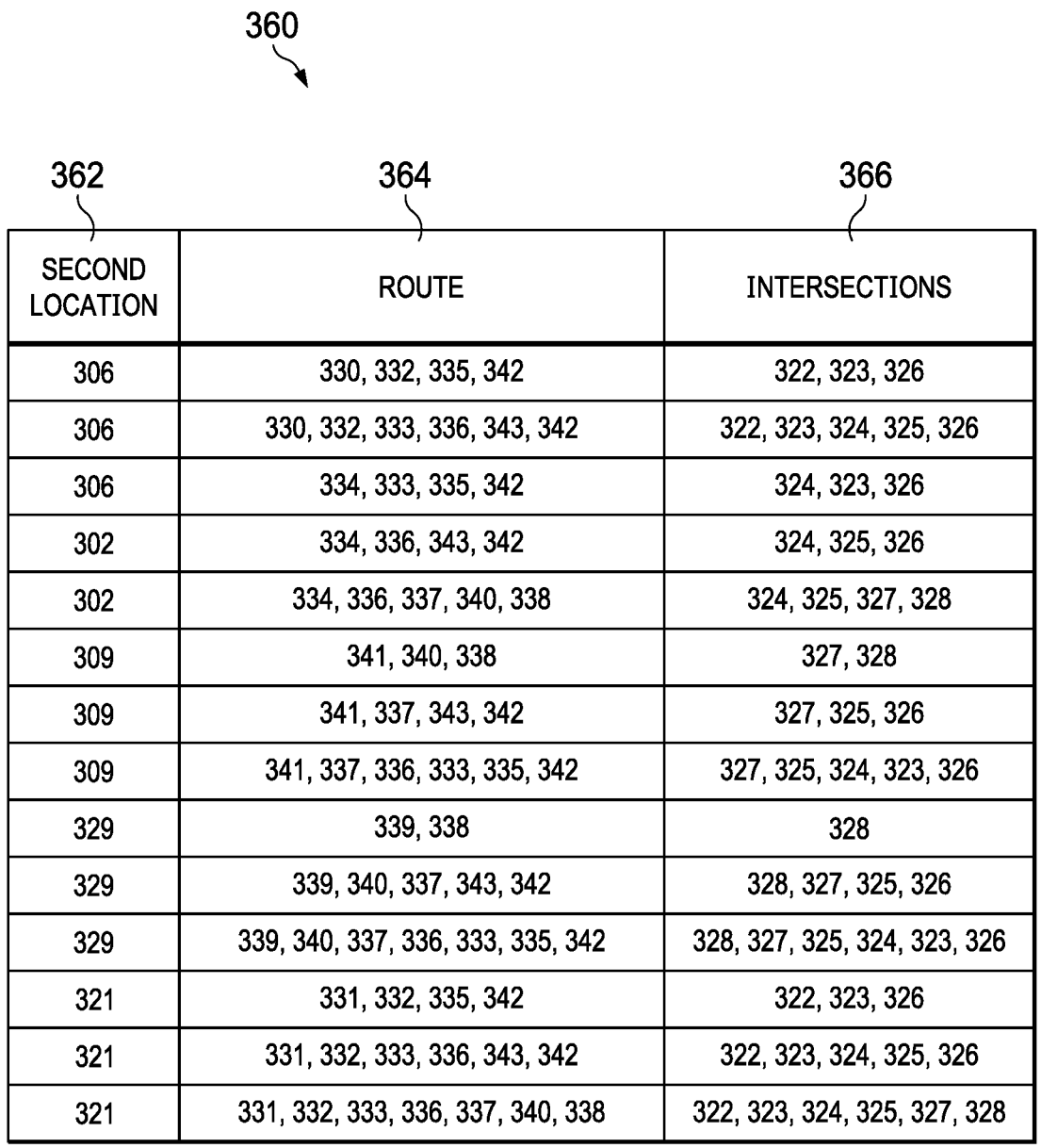
FIG. 3B is an illustration of a chart of possible commuting routes in accordance with an illustrative embodiment

Turning now to FIG. 3B, a chart of possible routes for commutes is depicted in accordance with an illustrative embodiment. Chart 360 shows a number of second locations and routes that may be taken to get from each second location to first location 320 in FIG. 3A. Also shown are the intersections encountered on each route. For example, an employee living at second location 306 may have three different routes to get to and from first location 320 in FIG. 3A. An employee living at second location 302 may have two different routes available to get to and from first location 320 in FIG. 3A. A worker living at second location 309 may have three different routes to get to and from first location 320 in FIG. 3A. A worker living at second location 329 may have three different routes to get to and from first location 320 in FIG. 3A. A worker living at second location 321 may have three different routes to get to and from first location 320 in FIG. 3A. Thus chart 360 summarizes the possible routes and intersections encountered for an employee traveling from one of the secondary location to first location 320 in FIG. 3A or to return home from first location 320 to the employee's respective second location. Chart 360 may be used by commute computer system 200 to calculate combined predicted routes data 250 and other predicted data 254 in FIG. 2. Chart 360 may be used by commute computer system in conjunction with combined predicted routes data 250, other predicted data 254 and feeds 230 to provide recommended routes to an employee based on his secondary location. Moreover, machine intelligence 218 may learn from employee travel along the routes in FIG. 3B in order to improve combined predicted route data 250 and other predicted data 254. Traffic devices may be configured for controlling traffic to a location. Traffic devices, such as traffic control devices 830 in FIG. 8 and traffic control devices in step 1110 in FIG. 11, may be traffic devices located at intersections such as intersection 322, intersection 323, intersection 324, intersection 326, intersection 327, or intersection 328 in FIG. 3.

Figure 4:
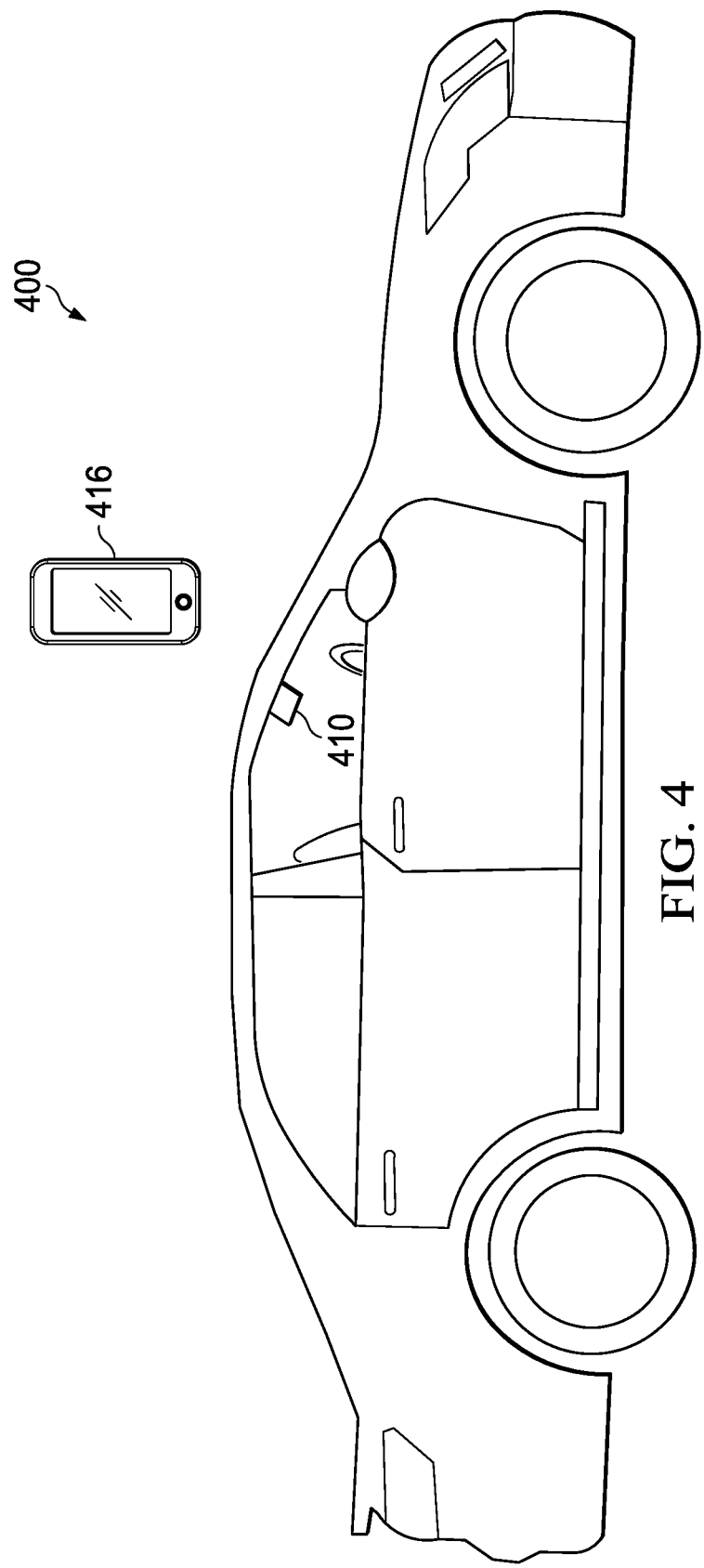
FIG. 4 is an illustration of a device for the commute computer system in accordance with an illustrative embodiment.

Turning now to FIG. 4, an illustration of a device for the commute computer system is depicted in accordance with an illustrative embodiment. Vehicle 400 may be any vehicle used by one or more of the individuals travelling from a secondary location to the first location. Vehicle 400 may be vehicle 118 in FIG. 1. Device 410 may be a tracking device that may provide location information regarding vehicle 400. Mobile phone 416 may be a mobile phone carried by a driver of a vehicle, such as vehicle 400. Mobile phone 416 may be mobile phone 116 in FIG. 1. Mobile phone 416 may be tracked and may provide location information regarding vehicle 400 when mobile phone 416 is located within vehicle 400.

Figure 5:
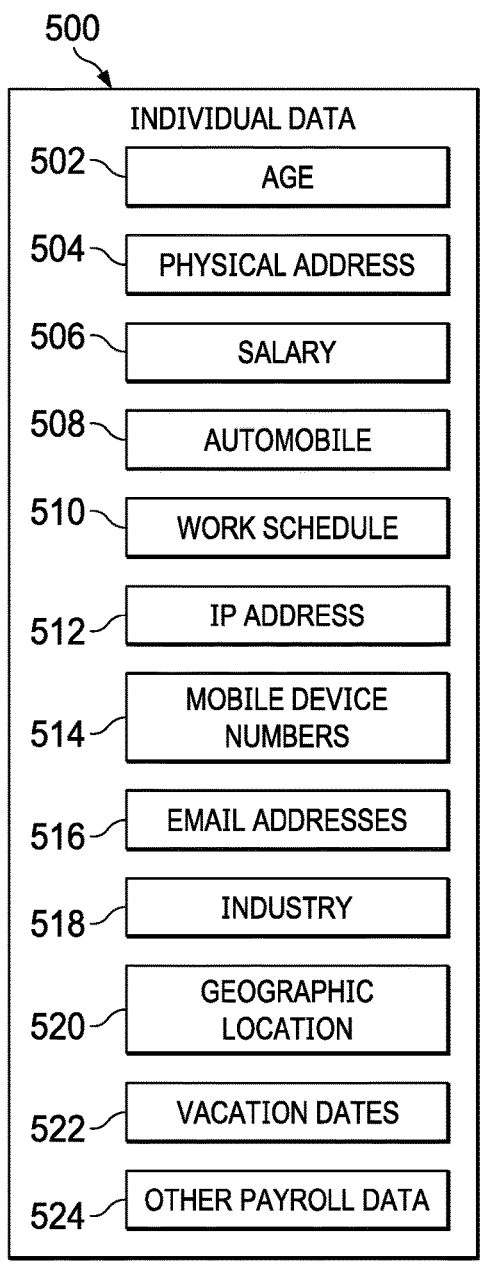
FIG. 5 is an illustration of an internal database in accordance with an illustrative embodiment.

Turning now FIG. 5, an illustration of an internal database containing individual data is depicted in accordance with an illustrative embodiment. Individual data 500 may comprise age 502, physical address 504, salary 506, automobile 508, work schedule 510, Internet Protocol (IP) address 512, mobile device numbers 514, email addresses 516, industry 518, geographic location 520, vacation dates 522, and other payroll data 524.

Figure 6:
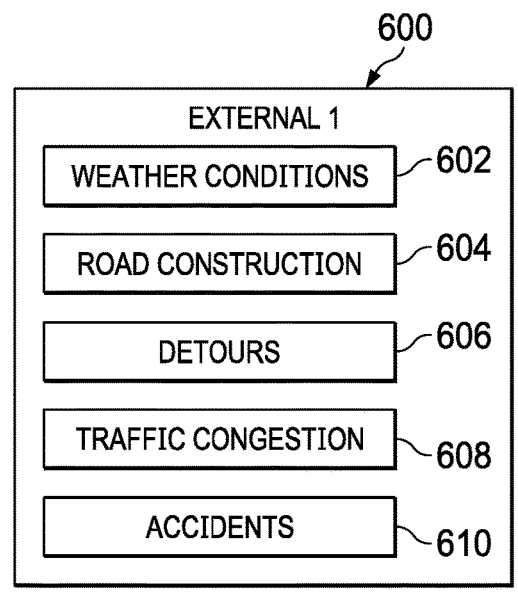
FIG. 6 is an illustration of an database in accordance with an illustrative embodiment.

FIG. 6 is an illustration of an external database depicted in accordance with an illustrative embodiment. External 1 600 may comprise weather conditions 602, road construction 604, detours 606, traffic congestion 608, and accidents 610.

Figure 7:
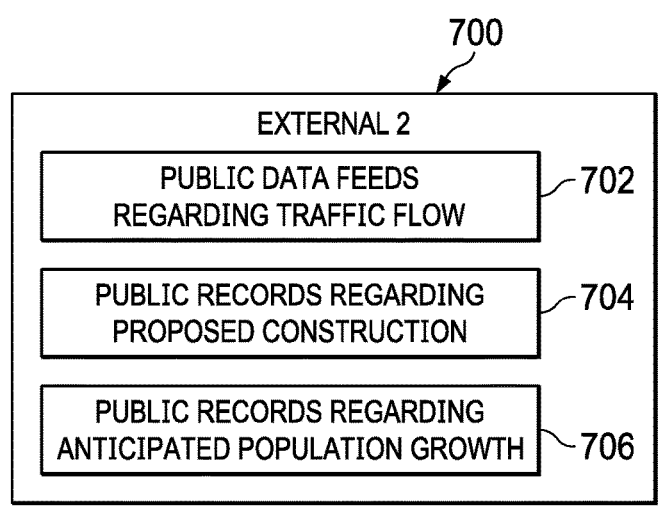
FIG. 7 is an illustration of an additional external database in accordance with an illustrative embodiment.

FIG. 7 is an illustration of an additional external database depicted in accordance with an illustrative embodiment. External 2 700 may comprise public data feeds regarding traffic flow 702, public records regarding proposed construction 704, and public records regarding anticipated population growth 706.

Figure 8:
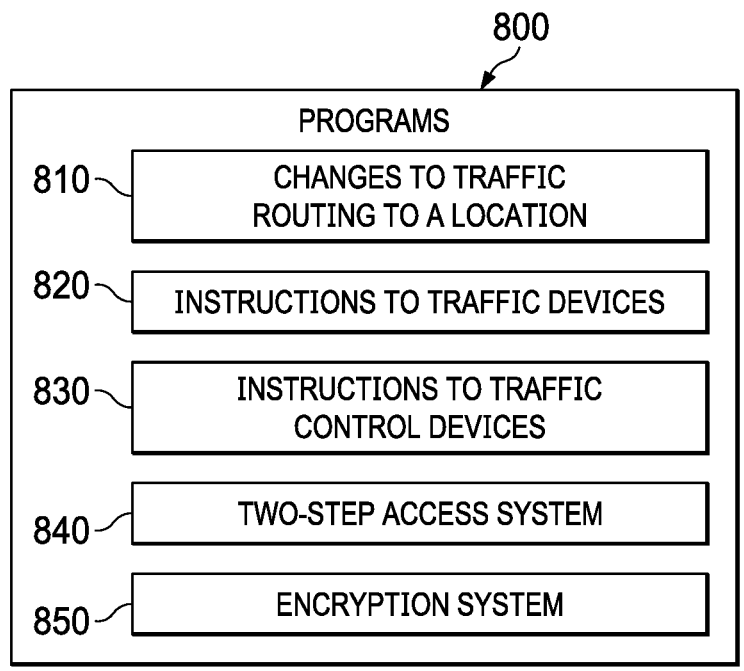
FIG. 8 is an illustration of programs stored in the commute data processing system in accordance with an illustrative embodiment.

FIG. 8 is an illustration of programs stored in the commute data processing system depicted in accordance with an illustrative embodiment. Programs 800 may comprise changes to traffic routing to a location 810, instructions to traffic devices 820, instructions to traffic control devices 830, two-step access system 840, and encryption system 850. Programs 800 may be configured to cause a processor unit, such as processor unit 1204 in FIG. 12, to perform operations such as depicted in the flowcharts of FIGS. 9-11.

Figure 9:
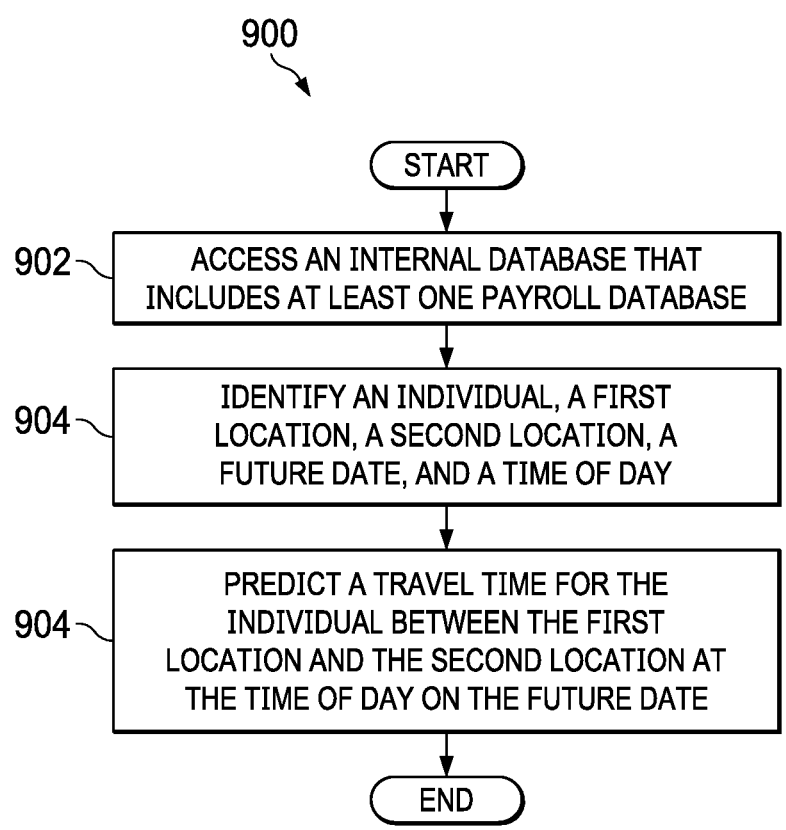
FIG. 9 is a flowchart of a process for a traffic prediction method in accordance with an illustrative embodiment.

FIG. 9 is a flowchart of a process for a traffic prediction method depicted in accordance with an illustrative embodiment. Process 900 can be implemented in software, hardware or combination of the two. When software is used, the software comprises program code that can be loaded from a storage device and run by a processor unit in a computer system such as commute computer system 200 in FIG. 2. Commute computer system 200 may reside in a network data processing system, such as network data processing system 100 in FIG. 1. For example, commute computer system 200 may reside on one or more of server computer 104, server computer 106, client computer 110, client computer 112, and client computer 114 connected by network 102 in FIG. 1.

Process 900 starts. An internal database that includes at least one payroll database is accessed (Step 902). An individual, a first location, a second location, a future date, and a time of day are identified (Step 904). The identification of the individual, the first location, the second location, the future date, and the time of day may be performed by a data processing system, such as data processing system 1200 operating in a network, such as network 102 in FIG. 1 and configured as commute computer system 200 in FIG. 2. Responsive to identifying the individual, the first location, the second location, the date, and the time of day, a determination is made of a predicted travel time for the individual between the first location and the second location at the time of day on the future date (Step 906). The determination of the predicted travel time may be made by gathering information 210 and machine intelligence 218 of commute computer system 200 operating in conjunction with the other elements of commute computer system 200, as depicted in FIG. 2. Process 900 terminates thereafter.

Figure 10:
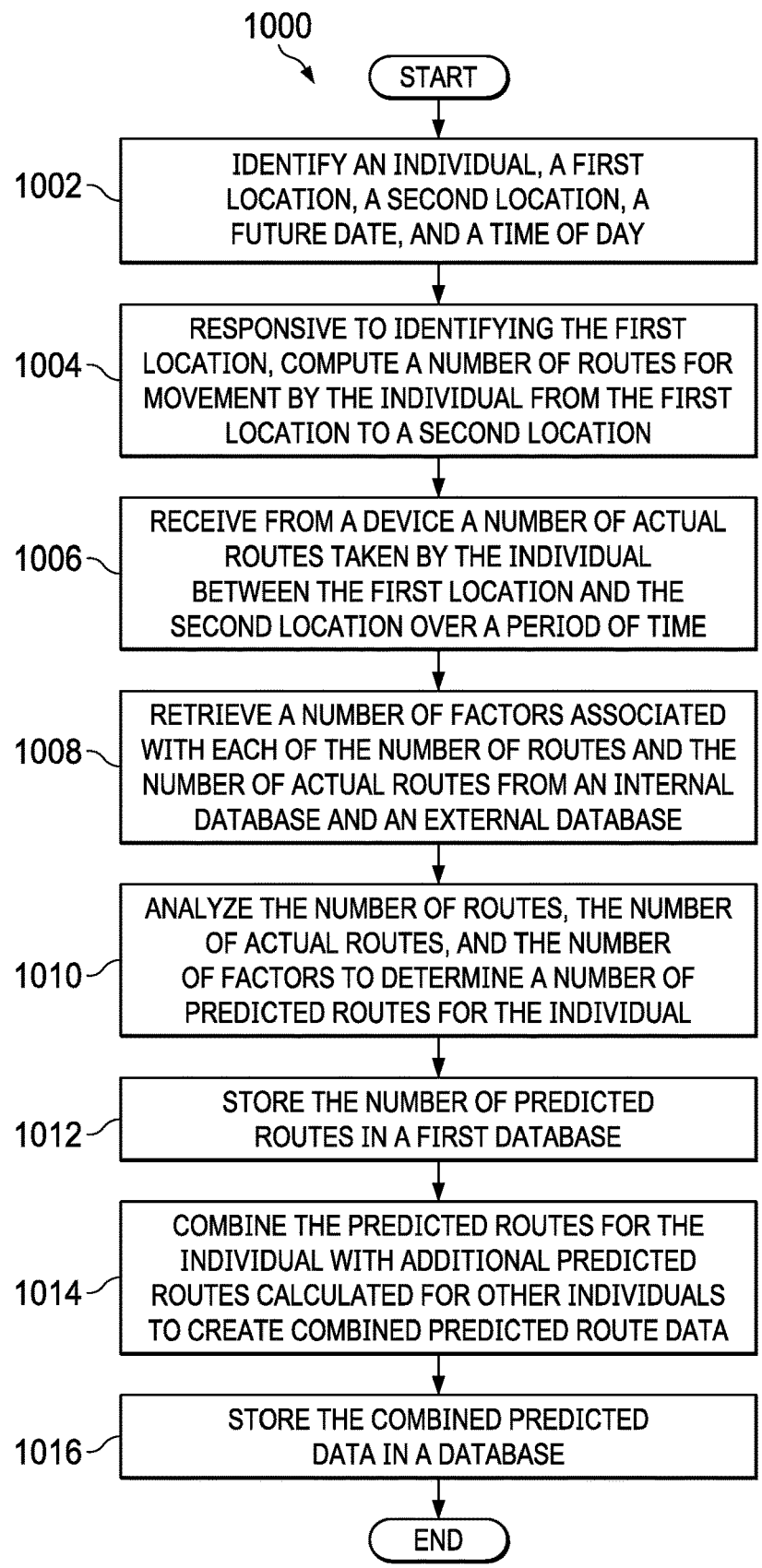
FIG. 10 is a flowchart of a process for a traffic prediction method in accordance with an illustrative embodiment.
Figure 11:
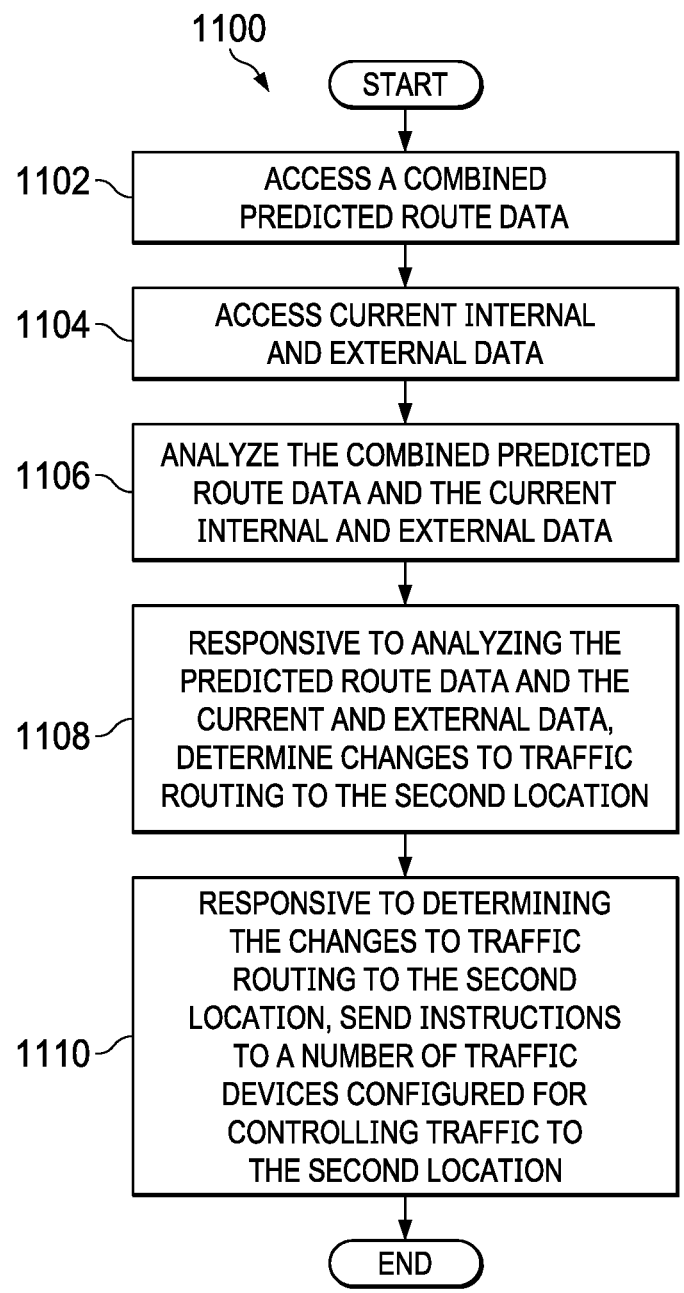
FIG. 11 is a flowchart of a process for a traffic control method in accordance with an illustrative embodiment.

FIG. 10 is a flowchart of a process for a traffic prediction method depicted in accordance with an illustrative embodiment. Process 1000 can be implemented in software, hardware or combination of the two. When software is used, the software comprises program code that can be loaded from a storage device and run by a processor unit in a computer system, such as commute computer system 200 in FIG. 2. Commute computer system 200 may reside in a network data processing system, such as network data processing system 100 in FIG. 1. For example, commute computer system 200 may reside on one or more of server computer 104, server computer 106, client computer 110, client computer 112, and client computer 114 connected by network 102 in FIG. 1.

Process 1000 starts. An individual, a first location, a second location, a future date, and a time of day are identified (Step 1002). The identification of the individual, the first location, the second location, the future date, and the time of day may be performed by a data processing system such as data processing system 1200 operating in a network such as network 102 in FIG. 1 and configured as commute computer system 200 in FIG. 2. Responsive to identifying the first location, a number of routes for movement by the individual from the first location to a second location are determined (Step 1004). The determination of the number of routes may be made by gathering information 210 and machine intelligence 218 of commute computer system 200 operating in conjunction with the other elements of commute computer system 200 depicted in FIG. 2. A number of actual routes taken by the individual between the first location and the second location over a period of time are received from a device (Step 1006). The device may be a cell phone of the individual, such as mobile phone 116 in FIG. 1 or mobile phone 416 in FIG. 4 or a device associated with an automobile of the individual, such as device 410 in FIG. 4. A number of factors associated with each of the number of routes and the number of actual routes are retrieved from an internal database and an external data base (Step 1008). The number of factors may be from a database, such as an internal database from internal databases 242 in FIG. 2, and may also be from an external data source, such as an external data source from external data sources 244. The number of factors may be from individual data 500 in FIG. 5, external data 1 600 in FIG. 6, and external data 2 700 in FIG. 7. The number of routes, the number of actual routes, and the number of factors are analyzed to determine a number of predicted routes for the individual (Step 1010). The analysis may be performed by one or more elements of commute computer system 200, in conjunction with machine intelligence 218 in FIG. 2. The predicted routes are stored in a first database (Step 1012). The first database may be routes 238 in FIG. 2. The predicted routes for the individual are combined with additional predicted routes calculated for other individuals to create combined predicted route data (Step 1014). The combined predicted data is stored in a second database (Step 1016). The second database may be combined predicted routes data 250 in FIG. 2. Process 1000 terminates thereafter.

FIG. 11 is a flowchart of a process for a traffic control method depicted in accordance with an illustrative embodiment. Process 1100 can be implemented in software, hardware, or combination of the two. When software is used, the software comprises program code that can be loaded from a storage device and run by a processor unit in a computer system such as commute computer system 200 in FIG. 2. Commute computer system 200 may reside in a network data processing system, such as network data processing system 100 in FIG. 1. For example, commute computer system 200 may reside on one or more of server computer 104, server computer 106, client computer 110, client computer 112, and client computer 114 connected by network 102 in FIG. 1.

Process 1100 starts. A combined predicted route data is accessed (Step 1102). The combined predicted route data may be from combined predicted routes data 250 in FIG. 1. Current internal and external data are accessed (Step 1104). The combined predicted route data and the current internal and external data are analyzed (Step 1106). The current internal and external data may be accessed from internal databases 242, external data sources 244, and devices 246 in FIG. 2, as well the databases depicted in FIGS. 5-7. The analysis may be performed by commute computer system 200, including information gathering 210 and machine intelligence 218 in FIG. 2. Responsive to analyzing the predicted route data and the current and external data, changes to traffic routing to the second location are determined (Step 1108). Changes to traffic routing may be from programs 800, such as changes to traffic routing to a location 810. Devices may be a device, such as device 410 in FIG. 4. Traffic devices configured for controlling traffic to a location maybe traffic devices at intersections, such as intersection 322, intersection 323, intersection 324, intersection 326, intersection 327, and intersection 328 in FIG. 3A. Responsive to determining the changes to traffic routing to the second location, instructions are sent to a number of traffic devices configured for controlling traffic to the second location (Step 1110). Instructions may be instructions to devices 800 and instructions to traffic control devices 830 in FIG. 8. Process 1100 terminates thereafter.

Turning now to FIG. 12, an illustration of a block diagram of a data processing system is depicted in accordance with an illustrative embodiment. Data processing system 1200 may be used to implement one or more computers and computer system 122 in FIG. 1. Data processing system 1200 can be used to implement data processing systems such as server computer 104, server computer 106, client computer 110, client computer 112, client computer 114 and other data processing systems that may be present in network data processing system 100.

In this illustrative example, data processing system 1200 includes communications framework 1202, which provides communications between processor unit 1204, memory 1206, persistent storage 1208, communications unit 1210, input/output unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1206 may also be referred to as computer-readable storage devices in these illustrative examples. Memory 1206, in these examples, may be, for example, a random-access memory or any other suitable volatile or non-volatile storage device. Persistent storage 1216 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer-usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these illustrative examples. In one example, computer-readable media 1220 may be computer-readable storage media 1224 or computer-readable signal media 1226.

In these illustrative examples, computer-readable storage media 1224 is a physical or tangible storage device used to store program code 1218 rather than a medium that propagates or transmits program code 1218. Alternatively, program code 1218 may be transferred to data processing system 1200 using computer-readable signal media 1226.

Computer-readable signal media 1226 may be, for example, a propagated data signal containing program code 1218. For example, computer-readable signal media 1226 may be at least one of an electromagnetic signal, an optical signal, or any other suitable type of signal. These signals may be transmitted over at least one of communication links, such as wireless communication links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for traffic prediction, the computer implemented method comprising:
   accessing, by a machine intelligence application including machine learning and predictive algorithms running on a processor unit, an internal database that includes at least one payroll database;
   identifying, by the machine intelligence application running on the processor unit, an individual, a first location, a second location, a future date, and a time of day;
   responsive to identifying the individual, the first location, the second location, the future date, and the time of day, determining, by the machine intelligence application running on the processor unit, a predicted travel time for the individual between the first location and the second location at the time of day on the future date;
   responsive to identifying the first location, computing, by the machine intelligence application running on the processor, a number of routes for movement by the individual from the first location to the second location based on predicted factors from predictive algorithms of the machine intelligence application;
   combining, by the machine intelligence application running on the processor unit, the predicted routes for the individual with additional predicted routes calculated for other individuals to create combined predicted route data that is improved with regard to the routes by employee travel along the routes from machine learning of the machine intelligence application, wherein the combined predicted route data comprises combined predicted travel times for individuals;
   accessing, by the machine intelligence application running on the processor unit, the combined predicted route data;
   accessing, by the machine intelligence application running on the processor unit, current internal and external data;
   analyzing, by the machine intelligence application running on the processor unit, the combined predicted route data, the current internal and external data;
   responsive to analyzing the combined predicted route data, determining, by the machine intelligence application running on the processor unit, changes to traffic routing to the second location; and
   responsive to determining changes to traffic routing to the second location, sending, by the machine intelligence application running on the processor unit, instructions to a number of traffic devices thereby controlling traffic to the second location.

2. The computer-implemented method of claim 1, further comprising:
   receiving from a device, by the machine intelligence application running on the processor unit, a number of actual routes taken by the individual between the first location and the second location over a period of time;
   retrieving from a source, by the machine intelligence application running on the processor unit, a number of factors associated with each of the number of routes and the number of actual routes;
   analyzing by the machine intelligence application running on the processor unit, the number of routes, the number of actual routes, and the number of factors to determine a number of predicted routes for the individual; and delivering, by the machine intelligence application running on the processor unit, the number of predicted routes to a first database.

3. The computer-implemented method of claim 2, wherein the number of factors include a number of internal factors in an internal database and a number of external factors in an external database.

4. The computer-implemented method of claim 3, wherein the number of internal factors comprise:
an age of the individual, a physical address of the individual, a salary of the individual, an automobile of the individual, a work schedule of the individual, IP addresses of the individual, mobile device numbers of the individual, email addresses of the individual, an industry of the individual, and a geographic location of the individual.

5. The computer-implemented method of claim 3, wherein the number of external factors comprise:
weather conditions, road construction, detours, traffic congestion, and accidents, public data feeds regarding traffic flow, public records regarding proposed construction, and public records regarding anticipated population growth.

6. The computer-implemented method of claim 2, further comprising:
storing by the machine intelligence application running on the processor unit, the combined predicted data in a blockchain.

7. The computer-implemented method of claim 2, wherein the device is a mobile phone.

8. The computer implemented method of claim 2, wherein the device is a monitoring device affixed to an automobile of the individual.

9. The computer-implemented method of claim 1, wherein controlling traffic comprises at least one of closing a lane and opening a lane.

10. The computer-implemented method of claim 1, further comprising: securing, by the machine intelligence application running on the processor unit, access to a combined predicted database with one of a two-step access system and an encryption system.

11. A traffic prediction system comprising:
a processor unit connected to a number of internal sources, a number of external sources, and a combined predicted data database;
a device carried by an individual or affixed to a mode of transportation of the individual;
computer program instructions stored in a computer readable storage media and configured to cause a machine intelligence application including machine learning and predictive algorithms running on a processor unit to access an internal database that includes at least one payroll database, identify an individual, a first location, a second location, a future date, and a time of day, and responsive to the processor unit identifying the individual, the first location, the second location, the future date, and the time of day, to determine a predicted travel time for the individual between the first location and the second location at the time of day on the future date, determine changes to traffic routing to the second location and, responsive to determine changes to traffic routing to the second location, send instructions to a number of traffic devices thereby controlling traffic to the second location;
computer program instructions stored in the computer readable storage media and configured to cause the machine intelligence application running on the processor unit, responsive to identifying the first location, computing, by the processor, a number of routes for movement by the individual from the first location to the second location based on predicted factors from predictive algorithms of the machine intelligence application;
computer program instructions stored in the computer readable storage media and configured to cause the machine intelligence application running on the processor unit to receive, from a device, a number of actual routes taken by the individual between the first location and the second location over a period of time;
computer program instructions stored in the computer readable storage media and configured to cause the machine intelligence application running on the processor unit to retrieve a number of factors associated with each of the number of routes and the number of actual routes;
computer program instructions stored in the computer readable storage media and configured to cause the machine intelligence application running on the processor unit, to analyze the number of routes, the number of actual routes, and the number of factors to determine a number of predicted routes for the individual;
computer program instructions stored in the computer readable storage media and configured to the machine intelligence application running on the processor unit to store the number of predicted routes in a first database; and
computer program instructions stored in the computer readable storage media and configured to cause the machine intelligence application running on the processor unit to c ombine the predicted route for the individual with additional predicted routes calculated for other individuals to create combined predicted route data that is improved with regard to the routes by employee travel along the routes from machine learning of the machine intelligence application, wherein the combined predicted route data comprises combined predicted travel times for individuals.

12. The traffic prediction system of claim 11, further comprising:
computer program instructions stored in the computer readable storage media and configured to cause the machine intelligence application running on the processor unit to store the combined predicted data in a blockchain.

13. The traffic prediction system of claim 11, wherein the device is one of a mobile phone and a monitoring device affixed to an automobile of the individual.

14. The traffic prediction system of claim 11, wherein controlling traffic comprises at least one of closing a lane and opening a lane.

15. The traffic prediction system of claim 11, wherein controlling traffic comprises controlling at least one traffic device located at an intersection.

16. A traffic control system comprising:
a machine intelligence application including machine learning and predictive algorithms;
a processor unit connected to a number of internal sources, a number of external sources, and a combined predicted data database that combines predicted routes for an individual with additional predicted routes calculated for other individuals to create combined predicted route data that is improved with regard to the routes by employee travel along the routes from machine learning of the machine intelligence application, wherein the combined predicted route data comprises combined predicted travel times for individuals;
a device carried by an individual or affixed to a mode of transportation of the individual; and
computer program instructions stored in a storage route and configured to cause the machine intelligence application running on the processor unit, to access an internal database that includes at least one payroll database, to identify an individual, a first location, and a second location, to analyze predicted route data, to determine changes to traffic routing to the second location and, responsive to determine changes to traffic routing to the second location, send instructions to a number of traffic devices thereby controlling traffic to the second location;
computer program instructions stored in the storage route and configured to cause the machine intelligence application running on the processor unit, responsive to identifying the first location, computing, by the processor, a number of routes for movement by the individual from the first location to the second location based on predicted factors from predictive algorithms of the machine intelligence application;
computer program instructions stored in the storage route and configured to cause the machine intelligence application running on the processor unit to receive, from a device, a number of actual routes taken by the individual between the first location and the second location over a period of time;
computer program instructions stored in the storage route and configured to cause the machine intelligence application running on the processor unit to retrieve a number of factors associated with each of the number of routes and the number of actual routes;
computer program instructions stored in the storage route and configured to cause the machine intelligence application running on the processor unit, to analyze the number of routes, the number of actual routes, and the number of factors to determine a number of predicted routes for the individual;
computer program instructions stored in the storage route and configured to the machine intelligence application running on the processor unit to store the number of predicted routes in a first database; and
computer program instructions stored in the storage route and configured to cause the machine intelligence application running on the processor unit to combine the predicted route for the individual with additional predicted routes calculated for other individuals to create combined predicted route data that is improved with regard to the routes by employee travel along the routes from machine learning of the machine intelligence application, wherein the combined predicted route data comprises combined predicted travel times for individuals.

17. The traffic control system of claim 16, wherein controlling traffic comprises at least one of closing a lane and opening a lane.

18. A non-transitory computer readable storage media comprising:
computer program instructions stored on the non-transitory computer readable storage media and configured to cause a processor unit to access a machine intelligence application and an internal database that includes at least one payroll database;
computer program instructions stored on the computer readable storage media and configured to cause the processor unit to identify an individual, a first location, a second location, a future date, and a time of day;
computer program instructions stored on the computer readable storage media and configured to cause the processor unit, responsive to identifying the individual, the first location, the second location, the future date, and the time of day, to determine a travel time for the individual between the first location and the second location on the future date and at the time of day determine changes to traffic routing to the second location and, responsive to determine changes to traffic routing to the second location, send instructions to a number of traffic devices thereby controlling traffic to the second location;
computer program instructions stored on the computer readable storage media and configured to cause the processor unit, responsive to identifying the first location, to compute a number of routes for movement by the individual from the first location to the second location based on predicted factors from predictive algorithms of the machine intelligence application;
computer program instructions stored on the computer readable storage media and configured to cause the processor unit, to receive, from a device, a number of actual routes taken by the individual between the first location and the second location over a period of time;
computer program instructions stored on the computer readable storage media and configured to cause the processor unit, to retrieve a number of factors associated with each of the number of routes and the number of actual routes;
computer program instructions stored on the computer readable storage media and configured to cause the processor unit, to analyze the number of routes, the number of actual routes, and the number of factors to determine a number of predicted routes for the individual;
computer program instructions stored in the computer readable storage media and configured to the machine intelligence application running on the processor unit to store the number of predicted routes in a first database; and
computer program instructions stored in the computer readable storage media and configured to cause the machine intelligence application running on the processor unit to combine the predicted route for the individual with additional predicted routes calculated for other individuals to create combined predicted route data that is improved with regard to the routes by employee travel along the routes from machine learning of the machine intelligence application, wherein the combined predicted route data comprises combined predicted travel times for individuals.

19. The non-transitory computer readable storage media of claim 18, further comprising:
computer program instructions stored on the computer readable storage media and configured to cause the processor unit, to store the number of predicted routes in a blockc hain.

20. The non-transitory computer readable storage media of claim 18, wherein controlling traffic comprises at least one of closing a lane and opening a lane.

21. The non-transitory computer readable storage media of claim 18, wherein controlling traffic comprises controlling at least one traffic device located at an intersection.

* * * * *